US009141671B2

(12) United States Patent
Schmidt

(10) Patent No.: US 9,141,671 B2
(45) Date of Patent: Sep. 22, 2015

(54) SYSTEM AND METHOD FOR PRESENTING FILTER OPTIONS TO A USER BASED ON ONGOING MONITORING OF FILTER SELECTIONS

(75) Inventor: Daniel F. Schmidt, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 1511 days.

(21) Appl. No.: 12/467,384

(22) Filed: May 18, 2009

(65) Prior Publication Data
US 2010/0293073 A1 Nov. 18, 2010

(51) Int. Cl.
*G06T 11/20* (2006.01)
*G06Q 30/00* (2012.01)
*G06F 17/30* (2006.01)
*G06Q 30/02* (2012.01)
*G06Q 30/06* (2012.01)

(52) U.S. Cl.
CPC .... *G06F 17/30525* (2013.01); *G06F 17/30528* (2013.01); *G06Q 30/02* (2013.01); *G06Q 30/0603* (2013.01)

(58) Field of Classification Search
USPC .......................................... 705/26
See application file for complete search history.

(56) References Cited

U.S. PATENT DOCUMENTS

| 5,828,351 A * | 10/1998 | Wu ................................. 345/11 |
| 6,963,867 B2 * | 11/2005 | Ford et al. ..................... 707/752 |
| 2002/0038456 A1 * | 3/2002 | Hansen et al. .................. 725/46 |
| 2009/0322756 A1 * | 12/2009 | Robertson et al. ............ 345/440 |

OTHER PUBLICATIONS eBay, "Cameras, Photography Equipment and Digital Camera items on eBay.com", http://photography.shop.ebay.com/items/Digital-Cameras_W0QQQ5fcatrefZ1QQQ5fcatrefZ1QQ_flnZ1QQ_sacatZ64352, availabe online Sep. 1, 2008.*
Amazon.com, "Music_Save on thousands of CDs from your favorite artists", http://www.amazon.com/music-rock-classical-pop-jazz/b?ie=UTF8&node=5174, available on line Jun. 27, 2008.*

* cited by examiner

*Primary Examiner* — Ariel Yu
(74) *Attorney, Agent, or Firm* — Marc S. Kaufman; Gerard M. Donovan; Reed Smith LLP

(57) ABSTRACT

Various embodiments are presented which comprise an electronic catalog of products, wherein the catalog comprises a taxonomy of product categories and products within the categories, wherein various users input filter parameters and these are monitored, whereupon the information about which filter parameters have been selected is used to change which values of attributes relevant to the products are displayed for the user when they are making their selections.

27 Claims, 16 Drawing Sheets

801: Using a computer processor, operating a database module configured to store an electronic catalog of products, wherein the catalog comprises a taxonomy of products categories and products within the categories, the catalog further comprising attributes which describe products in a category and at least one value for said attributes 802: using a computer processor, operating a user interface module configured to display a subset of products in the catalog based on a filter parameter set consisting of categories and/or attributes 803: Using a computer processor, operating a query module configured to display a set of filter parameters as options, receive a set of filter parameters as choices from the user, query the catalog, and present information in the catalog corresponding to the filter parameters to said user interface module for display to users 804: Using a computer processor, operating a monitoring module configured to monitor the filter parameters received by the query module to generate user activity data consisting of filter parameter selections 805: Using a computer processor, operating a filter refinement module configured to analyze the user activity data received by the monitoring module and regulate which at least one of filter parameters appear as options for the user in the query module and how many filter parameters appear as options for the user

FIG.9

Montoring Module (108)

Monitoring Log Data (901):

Canon USA™; Canon USA™; Nikon™; Sony™; Sony™; Canon USA™; Olympus™...

Monitoring Log Summary (902):
(Digital Cameras/Recording By Brand):
47 Canon USA™ (47%); 25 Sony™ (25%); 15 Nikon™ (15%); 5 Olympus™ (5%); 5 Panasonic™ (5%); 3 Other Brands (3%)

Echelon 1A (902): Show Brands Covering 80% of Filter Parameter Selections:
47 Canon USA™ (47%); 25 Sony™ (25%); 15 Nikon™ (15%)

Echelon 2A (903): Show Brands Covering 95% of Filter Parameter Selections: 47 Canon USA™ (47%), 25 Sony™ (25%), 15 Nikon™ (15%), 5 Olympus™ (5%), 5 Panasonic™ (5%)

Echelon 1B (904): Only Show Brands with 10% or more of Filter Parameter Selections:
47 Canon USA™ (47%); 25 Sony™ (25%); 15 Nikon™ (15%)

Echelon 2B (905): Only Show Brands with 5% or more of Filter Parameter Selections:
47 Canon USA™ (47%), 25 Sony™ (25%), 15 Nikon™ (15%), 5 Olympus™ (5%), 5 Panasonic™ (5%)

Echelon 1C (906): Show 3 Brands with the Most Clicks
47 Canon USA™ (47%); 25 Sony™ (25%); 15 Nikon™ (15%)

Echelon 2C (907): Show 5 Brands with the Most Clicks
47 Canon USA™ (47%); 25 Sony™ (25%); 15 Nikon™ (15%); 5 Olympus™ (5%); 5 Panasonic™ (5%)

FIG. 15

> Montoring Module (108):
>
> Filter Records (1500);
>
> Filter 1 Data (1501): (See FIG. 7): Cell Phones: Sony Ericsson Mobile Communications: $50-$100:AT&T
>
> Filter 2 Data (1502): (See FIG. 13): Digital Cameras: Sony™:$200-$300: Ultracompact: 3X to 4X: 7 Megapixels
>
> Filter 3 Data (1503): (See FIG. 14): Digital Cameras: Canon USA™: More than $1,200:2 in or more: 8 Megapixels and Up: Microdrive
>
> (etc.)
> Filter Refinement Module (112)
> Filter Data Refinement Transformations: (1504)
> Select only Filter Data where Category = Digital Cameras (1505)
> Records 2 and 3 kept.
>
> Select only Brand for those Records: (1506)
> Results: Sony™, Canon USA™

SYSTEM AND METHOD FOR PRESENTING FILTER OPTIONS TO A USER BASED ON ONGOING MONITORING OF FILTER SELECTIONS

CROSS-REFERENCE TO RELATED APPLICATIONS

The present invention shares common subject matter with the following applications, which also share common inventor and assignee: "SYSTEM AND METHOD FOR TARGETING CONTENT BASED ON FILTER ACTIVITY", "SYSTEM AND METHOD FOR TRACKING FILTER ACTIVITY AND MONITORING TRENDS ASSOCIATED WITH SAID ACTIVITY", and "SYSTEM AND METHOD FOR INCORPORATING USER INPUT INTO FILTER-BASED NAVIGATION OF AN ELECTRONIC CATALOG", all also submitted on this date. These co-pending applications were not previously published in any form.

FIELD OF THE INVENTION

The present invention relates to a system and method for managing the options that are available to a user when selecting filter parameters to navigate an online catalog of items, technology, and products.

DESCRIPTION OF THE RELATED ART

Many websites are configured as online catalogs. These catalogs act as alternatives to traditional paper catalogs and offer enhanced navigational features when compared to their paper counterparts, as well as the advantages of broad, easy distribution. With the advent and increasing popularity of the Internet, suppliers have access to a much larger customer base. Through the Internet, the market base of manufacturers and resellers may be maximized while the associated overhead may potentially be drastically reduced. If an electronic catalog is well-organized and presented, it can help consumers to make good purchasing decisions by providing extensive information about the products they contain in an easy-to-navigate manner. Such a catalog either allows the consumers to gain information about products they will purchase elsewhere or to make purchases within the site itself. Additionally, such a catalog serves as a site where companies may purchase advertising to market their products.

Such electronic catalogs generally store, in a database, information about a number of products which may be anything from electronics to housewares to apparel, or any other type of item which may be depicted and/or described electronically. Such items may be described by a taxonomy, which describes the set of products with a set of information that consists of a set of attributes that assume values. That is, each product might be associated with a price, brand, or other attribute. Some attributes would only be stored for some classes of product. For example, weight might be a attribute with respect to laptops, but not desktop computers, while both might have a processor speed attribute.

Once a retailer or other content provider has provided a taxonomy for its products, it remains for the users of the catalog system to retrieve the products using the taxonomy system. One way to do this is by performing searches using filters. These filters are composed of individual filter parameters, which are rules which narrow the selection of products in a taxonomy according to some criterion. Such filters constrain the allowable values of the attributes, and thereby generate a more manageable subset of the products that the user may use, manipulate, and digest. Together, a set of filter parameters forms a filter, which represents a progressively narrowed selection of filter parameters. An example filter would be that if a user were searching for digital cameras, the user might want cameras from Canon USA™, which are 6 megapixels or greater, and which are under $300 in price. A filter parameter set further consists of the individual, discrete filter parameters, which limit the user's search in a progressive manner. Each filter parameter imposes a constraint on one or more product attributes at a time.

Filters allow the users to reduce the potentially huge numbers of products which otherwise occupy catalogs and reduce them to a manageable numbers. They also allow users to focus their searches to meet their individualized needs, as well as incorporating factors such as ability to pay or brand requirements due to purchasing contracts. The prior art has only provided for manual intervention to limit, arrange, and manipulate the number and types of options for catalogs with filters.

SUMMARY OF THE INVENTION

Applicant has discovered that one can make helpful decisions about how to control which and how many choices are presented when selecting filter parameters when navigating a product catalog organized by a taxonomy by monitoring past selections of filter parameters. By using information which is incidental to the browsing operation of the catalog, the catalog may improve its interface and become more user-friendly for subsequent users.

The present invention enables data about past filter parameter selection to be collected and used to draw inferences about which filter parameters should be displayed as choices for the user when navigating the catalog, and how many should be displayed at a time. This selection process is accomplished with respect to the products in a catalog that are organized in a taxonomy. By monitoring filter parameter selections, patterns emerge in the distribution of filter parameter selections which naturally show that there is greater interest in certain filter parameters by users on the system, so it makes sense to display these filter parameters. Additionally, it may make sense to show a number of filter parameters where each filter parameter has incurred some threshold interest so that users are not overwhelmed by too many selections, but that there is an opportunity to see all of the major selections.

According to one embodiment of the invention, there is provided: A computer system for facilitating browsing of catalog information, said system comprising: a database module configured to store an electronic catalog of products, wherein the catalog comprises a taxonomy of products categories and products within the categories, the catalog further comprising attributes which describe products in a category and at least one value for said attributes, a user interface module configured to display a subset of products in the catalog based on a filter parameter set consisting of categories and/or attributes, a query module configured to display a set of filter parameters as options, receive a set of filter parameters as choices from the user, query the catalog, and present information in the catalog corresponding to the filter parameters to said user interface module for display to users, a monitoring module configured to monitor the filter parameters received by the query module to generate user activity data consisting of filter parameter selections, and a filter refinement module configured to analyze the user activity data received by the monitoring module and regulate which at least one of filter parameters appear as options for the user in the query module and how many filter parameters appear as options for the user.

According to one embodiment of the invention, there is provided: A method involving steps to be performed on a computing system consisting of multiple modules designed to perform computing functions, wherein at least part of the computing system's functionality is performed by hardware, for facilitating browsing of catalog information, the method comprising: Using a computer processor, operating a database module configured to store an electronic catalog of products, wherein the catalog comprises a taxonomy of products categories and products within the categories, the catalog further comprising attributes which describe products in a category and at least one value for said attributes, using a computer processor, operating a user interface module configured to display a subset of products in the catalog based on a filter parameter set consisting of categories and/or attributes, using a computer processor, operating a query module configured to display a set of filter parameters as options, receive a set of filter parameters as choices from the user, query the catalog, and present information in the catalog corresponding to the filter parameters to said user interface module for display to users, using a computer processor, operating a monitoring module configured to monitor the filter parameters received by the query module to generate user activity data consisting of filter parameter selections, and using a computer processor, operating a filter refinement module configured to analyze the user activity data received by the monitoring module and regulate which at least one of filter parameters appear as options for the user in the query module and how many filter parameters appear as options for the user.

According to one embodiment of the invention, there is provided: An apparatus involving means for performing steps to be performed on a computing system consisting of multiple modules designed to perform computing functions, wherein at least part of the computing system's functionality is performed by hardware for facilitating browsing of catalog information, the apparatus comprising: Means for, using a computer processor, operating a database module configured to store an electronic catalog of products, wherein the catalog comprises a taxonomy of products categories and products within the categories, the catalog further comprising attributes which describe products in a category and at least one value for said attributes, means for, using a computer processor, operating a user interface module configured to display a subset of products in the catalog based on a filter parameter set consisting of categories and/or attributes, means for, using a computer processor, operating a query module configured to display a set of filter parameters as options, receive a set of filter parameters as choices from the user, query the catalog, and present information in the catalog corresponding to the filter parameters to said user interface module for display to users, means for, using a computer processor, operating a monitoring module configured to monitor the filter parameters received by the query module to generate user activity data consisting of filter parameter selections, and means for, using a computer processor, operating a filter refinement module configured to analyze the user activity data received by the monitoring module and regulate which at least one of filter parameters appear as options for the user in the query module and how many filter parameters appear as options for the user.

According to one embodiment of the invention, there is provided: Computer readable media, having instructions stored thereon, wherein the instructions, when executed by a computer processor, perform steps to be performed on a computing system consisting of multiple modules designed to perform computing functions, wherein at least part of the computing system's functionality is performed by hardware for facilitating browsing of catalog information, the instructions comprising: Instructions for operating a user interface module configured to display a subset of products in the catalog based on a filter parameter set consisting of categories and/or attributes, instructions for operating a query module configured to display a set of filter parameters as options, receive a set of filter parameters as choices from the user, query the catalog, and present information in the catalog corresponding to the filter parameters to said user interface module for display to users, instructions for operating a monitoring module configured to monitor the filter parameters received by the query module to generate user activity data consisting of filter parameter selections, and instructions for operating a filter refinement module configured to analyze the user activity data received by the monitoring module and regulate which at least one of filter parameters appear as options for the user in the query module and how many filter parameters appear as options for the user.

BRIEF DESCRIPTION OF THE DRAWINGS

FIG. 5 is a screenshot of an catalog in accordance with an embodiment of the invention depicting a page where AT&T™ cell phones have been selected.

FIG. 6 is a screenshot of an catalog in accordance with an embodiment of the invention depicting a AT&T™ cell phones selling for between $50-$100 have been selected.

FIG. 7 is a screenshot of an catalog in accordance with an embodiment of the invention depicting a AT&T™ cell phones selling for between $50-$100 made by Sony Ericsson™ have been selected.

FIG. 8 is a flowchart illustrating the method according to one embodiment of the invention.

FIG. 9 is a mock display of recorded filter parameter logs and what actions the an embodiment takes based on the logs.

FIG. 15 is a mock display illustrating how the monitoring module 108 and filter refinement module 112 work in conjunction to provide the data for the filter refinement process.

DETAILED DESCRIPTION OF THE INVENTION

In the following description, numerous specific details are set forth in order to provide a thorough understanding of the present invention. It will be apparent however, to one skilled in the art, that the present invention may be practiced without some or all of these specific details. In other instances, well known process steps have not been described in detail in order not to unnecessarily obscure the present invention.

Embodiments are described herein that involve catalog data to which is stored and organized in an efficient manner through the use of a taxonomy. The taxonomy categorizes the products by attributes, where products are associated with one or more values of the attributes. Such attributes describe and organize the products in the catalog for retrieval.

Figure 1:
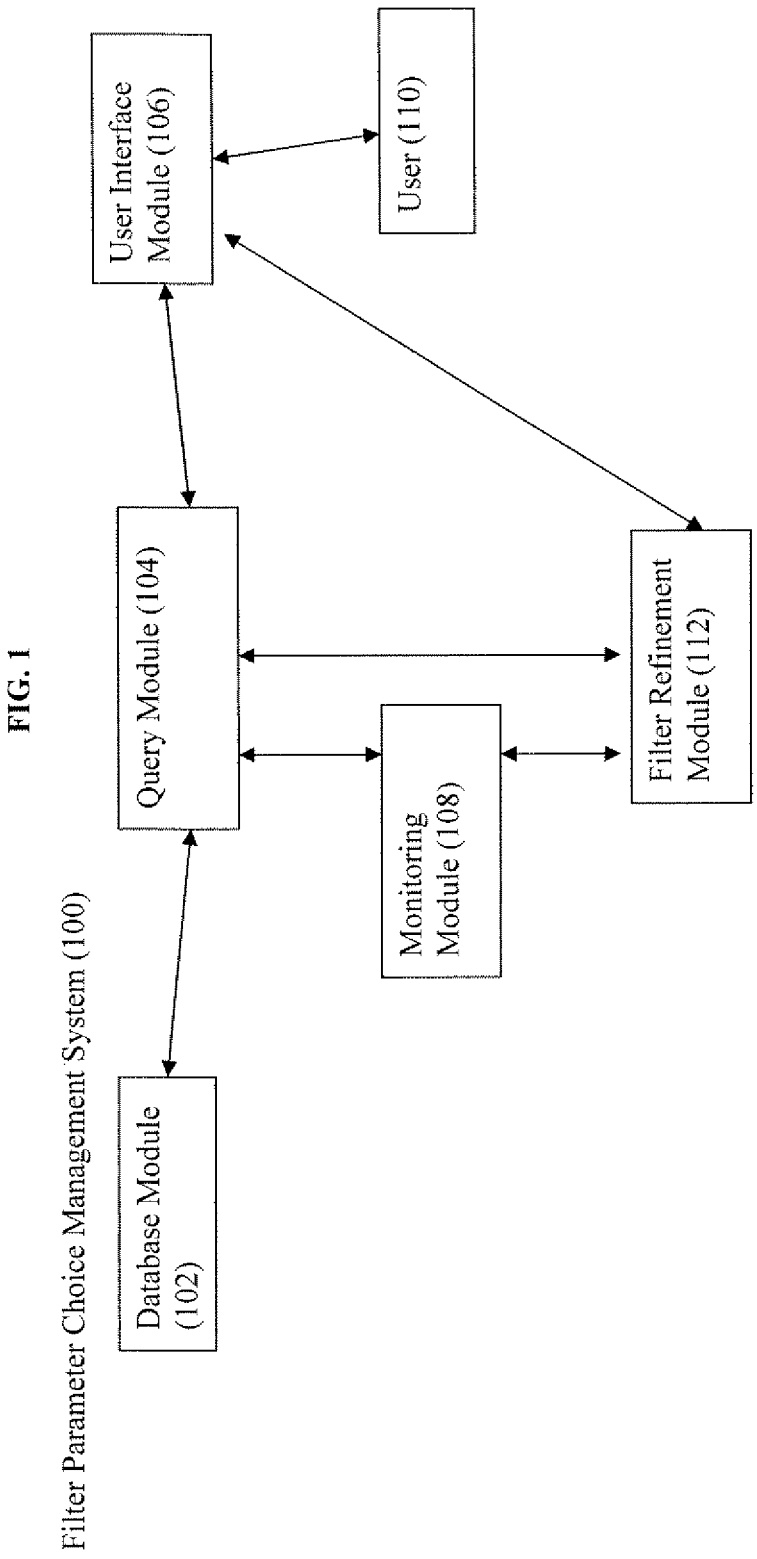
FIG. 1 is a block diagram illustrating the components of a system embodiment of the present invention.

The configuration of the filter parameter choice management system 100 is characterized in FIG. 1. The catalog is ideally stored in a database module 102. The database may preferably employ a relational model, though it may alternatively employ a flat model, hierarchical model, network model, dimensional model, object model, object-relational model or any combination of the above or other database formats. The database may use a querying language such as SQL to retrieve data internally. Alternatively, the catalog may be stored in another file or collection of files such as a word processing document, or spreadsheet. The catalog information may be stored on a single machine or on multiple machines over a network. Ideally the catalog is accessible over the Web though a web browser or over another network, but embodiments exist where the catalog is accessible directly from a dedicated program where the catalog is stored locally. The contents of the catalog may be stored upon any tangible medium, such as, but not limited to: magnetic media, optical media, magneto-optical media, solid-state memory, and/or flash memory. The catalog may be stored locally or distributed over a network.

The database receives requests to access the contents of the catalog from query module 104, which mediates requests which are required by the user interface module 106, which may preferably be a monitor with input devices such as a keyboard and mouse providing a Web page, or other GUI interface, but may also involve alternative forms of interaction such as a command line, audio input/output or printed output, or assorted I/O peripherals such as a joystick, gamepad, trackpad, trackball, or other forms of I/O such as those used by persons with disabilities, in order to interact with the users 110 and inform them about the operation of the system and obtain their desired filter parameters. This information flows to and from the user interface module 106 to the monitoring module 108, which records selections of filter parameters by users in the course of retrieving products from the catalog. The information retrieved and recorded by the monitoring module may relate to information about products, or the purchasing of products. The monitoring module 108 is in communication with the filter refinement module 112, which analyzes and manages the data from the monitoring data and controls which and how many options the user interface module 106 and query module 104 display when presenting the catalog and filter parameters to the user. In turn, as users 110 continue to interact with the embodiments, the monitoring module 108 receives more and more information from the query module 104's input in conjunction with the user interface module 106, and can transmit it to the filter refinement module 112 for progressively better handling of the interface presented by the user interface module 106.

Within the catalog, the taxonomy allows the products to be divided into categories, each of which has subcategories with their own particular set of subcategories. This categorization exists based on the structure of the attributes that are each associated with a given category of product. As an example, in one embodiment, the products could be computers, which are divided into subcategories of laptops and desktops. The laptops can be further subdivided into subcategories, which might include "netbook", "thin-and-light", "mainstream", and "desktop replacement". Attributes in these subcategories can be weight, price (which might be divided by ranges), and type of processor. On the other hand the desktops might also be have the attributes of price and type of processor, but might have other attributes associated with them, like "form factor" and "number of drive bays". Moreover, certain attributes might have multi-leveled answers. For example, a processor might he have a processor brand of Intel™, which would then lead to an attribute to differentiate that it was a "Core 2™", then "Core 2 Duo™" as opposed to "Core 2 Quad™".

Figure 2:
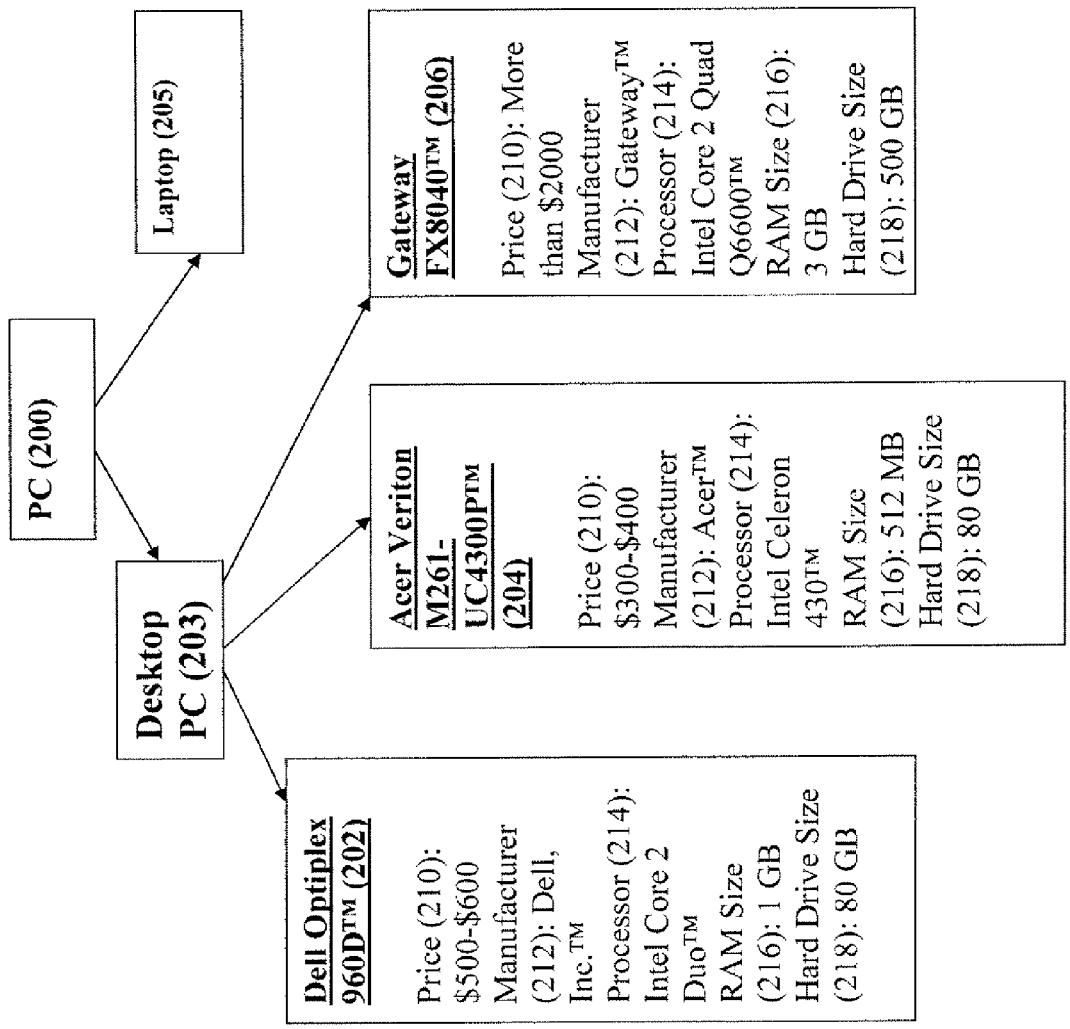
FIG. 2 is a diagram illustrating a taxonomy in accordance with system in which the present invention may be implemented.

An example taxonomy is presented in FIG. 2, for Desktop PCs. The category of PCs 200 branches into the subcategories of Desktop PCs 203 and Laptop PCs 205. Desktop PCs 203 contain 3 examples of Desktop PCs, Dell Optiplex 960D™ (202) Acer Veriton M261-UC4300P™ (204), and the Gateway FX8040™ (206). Each of these has a value for attributes such as price 210, manufacturer 212, processor 214, RAM size 216, and hard drive size 218. Clearly, the implementation of such a taxonomy will differ by the database model or alternative schema used to store the database in the database module 102. However, given a relational model, such a taxonomy can be stored in one embodiment by associating the products with unique product IDs, then creating tables that associate the IDs with attributes, then creating tables that associate the IDs within the attributes with various values within the taxonomy, in a manner well known in the art to associate pieces of data with information that describes them through relational tables. However, many alternative embodiments are possible and this merely represents a preferred method of storing the catalog if the RDBMS approach is chosen.

It is to be noted that the catalog need not represent a set of tangible products represented by nodes within the taxonomy. The catalog may also operate on a digital level, and contain items of digital content. These items may contain digital text, audio, MIDI data, recorded audiobooks, digital music, bit-mapped and/or vector graphics, digital photographs, video, movies, TV episodes, digital documents, animations, software, web content, multimedia, any form of encoded or archived data, and/or any other type of file or group of files which may be use to store useful computer data. These files may be stored locally or remotely from the web site or other interface shell which is used to allow the user to access the catalog.

Ideally, a catalog which is an embodiment of the invention which incorporates one or more of these data types will operate as described below, except that attributes of the one or more data types will reflect characteristics of the type of data involved when using filters instead of characteristics of merchandise. For example, a catalog which contains video might have attributes such as "length" (which might be various ranges of minutes), "type" (which might be "black-and-white" or "color", or alternatively might include different levels of color quality), or might involve more qualitative attributes such as "genre" (i.e. action, comedy, drama, science-fiction, western) or "rating" (i.e., some sort of scale such as a star system or a points system). Note that some catalogs will have items in the taxonomy which may reflect pieces of merchandise which are linked to "virtual merchandise", that is pieces of digital media . . . for example, pieces of digital music might be linked to real-world CD albums on which the songs are located. Within the context of these attributes, the embodiments may facilitate the management and access to the media by controlling which filters are available at a given point in time.

Building upon the catalog, the embodiments allow the products to be accessed through the use of filters. These filters consist of combinations of filter parameters which limit the values of products in the catalog which will ultimately be selected. These filter parameters each specify at least one of a product category and an attribute. For example, given that a user was trying to find products in the laptops and desktops categories, both of those categories could be filter parameters for a filter, and additionally the filter might specify additional attributes of the computer that the user was searching for, such as that the computer should have at least 2 GB of RAM, 100 GB of hard drive space, an Intel™ processor, and that the processor should be a Core 2 Duo™.

However, there are issues with the operation of filters which lead to filters operating less effectively than they potentially might. For example, we lack intelligent methods to automatically determine which choices of filter parameter to display given a certain category and context. For example, there are many brands of hard drives, but having dozens of brands offered all at once as potential parameter values in a filter might be confusing to a user and have the effect of acting as clutter. At the same time, arbitrarily culling out brands without reason might deprive users of choices they would like to have. The embodiments present a novel and nonobvious compromise approach that uses information about past selections of filter parameters to dynamically narrow the set of filters that users may choose, basing it upon patterns of which filters users have selected.

Moreover, the total number of values of filter options, such as the numbers of processor speeds of various laptops to offer as options, could potentially be handled on a more intelligent basis. Now, arbitrary numbers of choices must be presented because there is no more meaningful way to determine how many choices of filter parameter associated with each attribute to display at a time.

Both which values and how many values could potentially be grouped into echelons, or levels, which lead to using various thresholds based on the past filter selections to determine which and how many total options will be displayed. However, there must be a basis for how the decisions underlying this process are carried out. The new approach to this problem provided by the embodiments involves automatic, programmatic solutions, contrasting with the manual approach which the prior art provides.

The order in which filter parameters are selected may be significant during the selection process, because, for example, if the user selects cameras such that they are 10 MP or greater as his or her first constraint, this may lead to available lens types that would not have been available had, for example, the user selected a camera that is $50 or less. However, assuming that a set of parameters is compatible with each other, an overall set of filters is not order-dependent once they have been selected.

Screenshots illustrating an example of a catalog interface which would contain an assortment of technology products and then progressively use filter parameters to narrow the selection of products which are under consideration are displayed in FIG. 3-7. Furthermore, the embodiments record and monitor one or more users' choice of filters over time, providing a pool of data which can then be used as a basis, in combination with a new filter selection, for recommendations of content.

Figure 3:
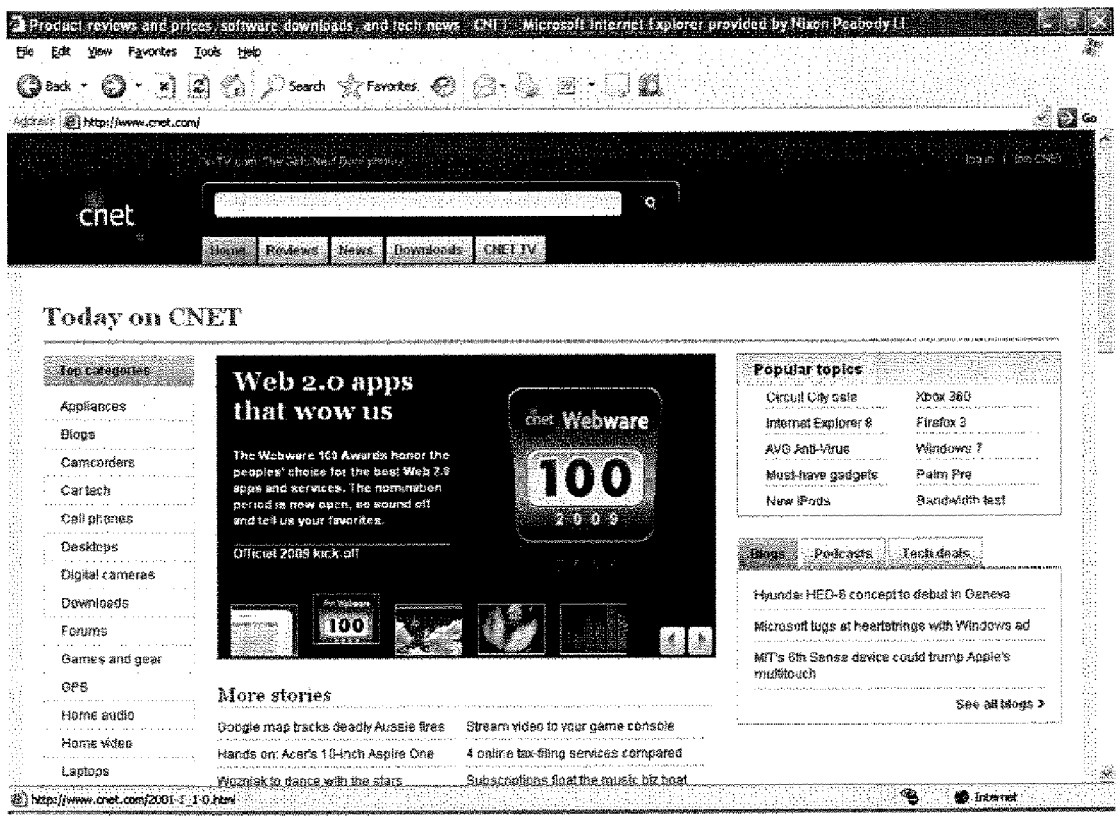
FIG. 3 is a screenshot of an catalog in accordance with an embodiment of the invention depicting a front-page for category selection.
Figure 4:
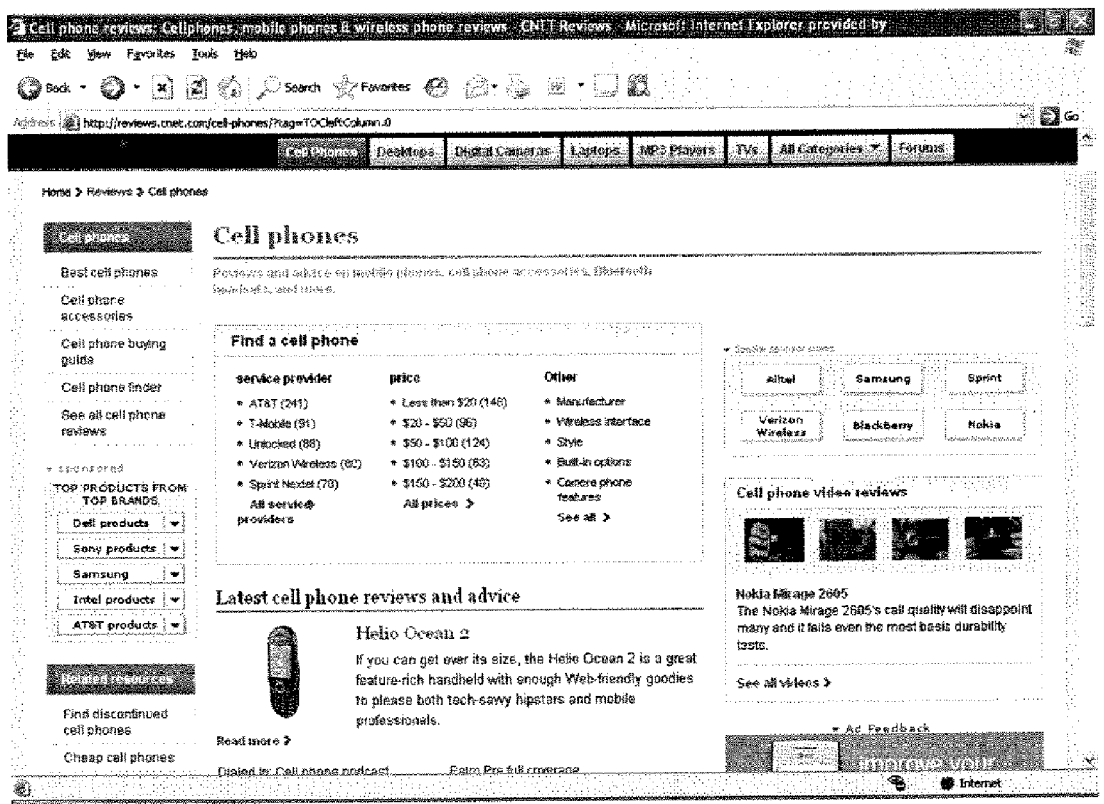
FIG. 4 is a screenshot of an catalog in accordance with an embodiment of the invention depicting a page where the cell phone category has been selected.
Figure 5:
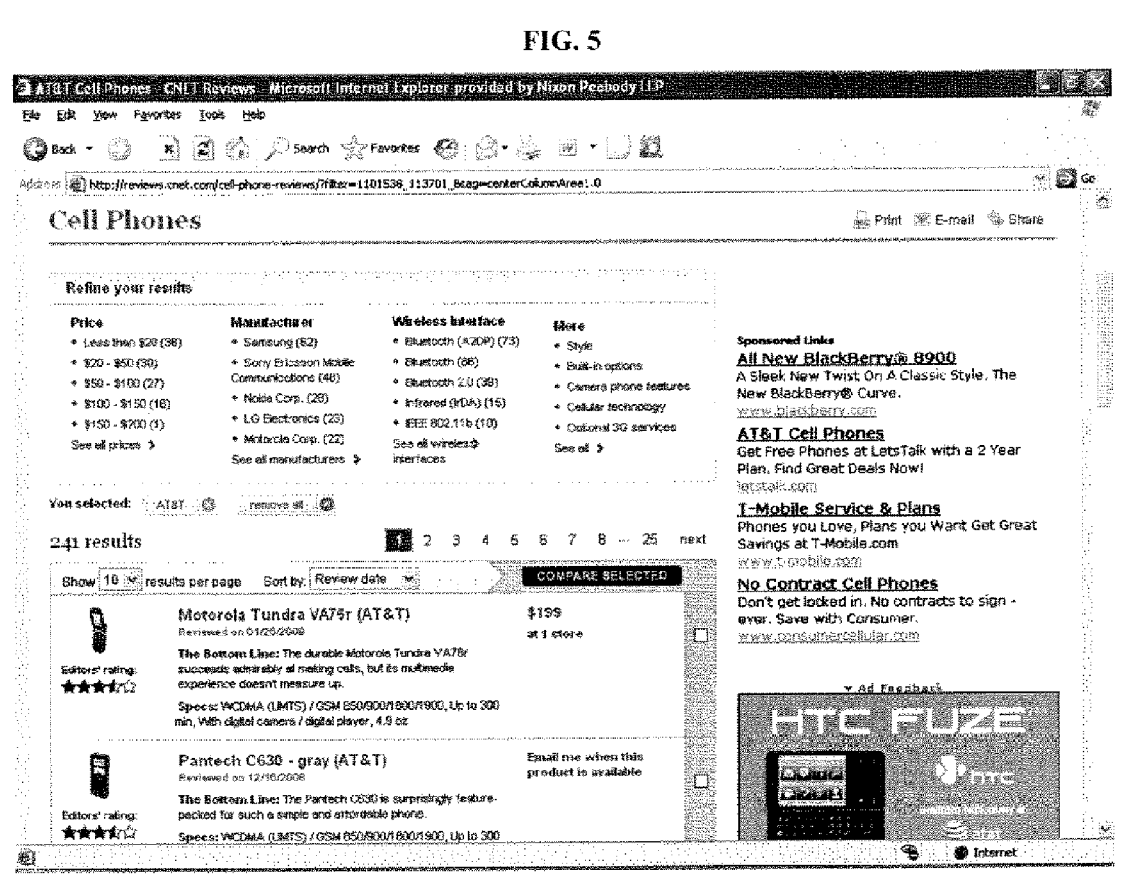
Figure 6:
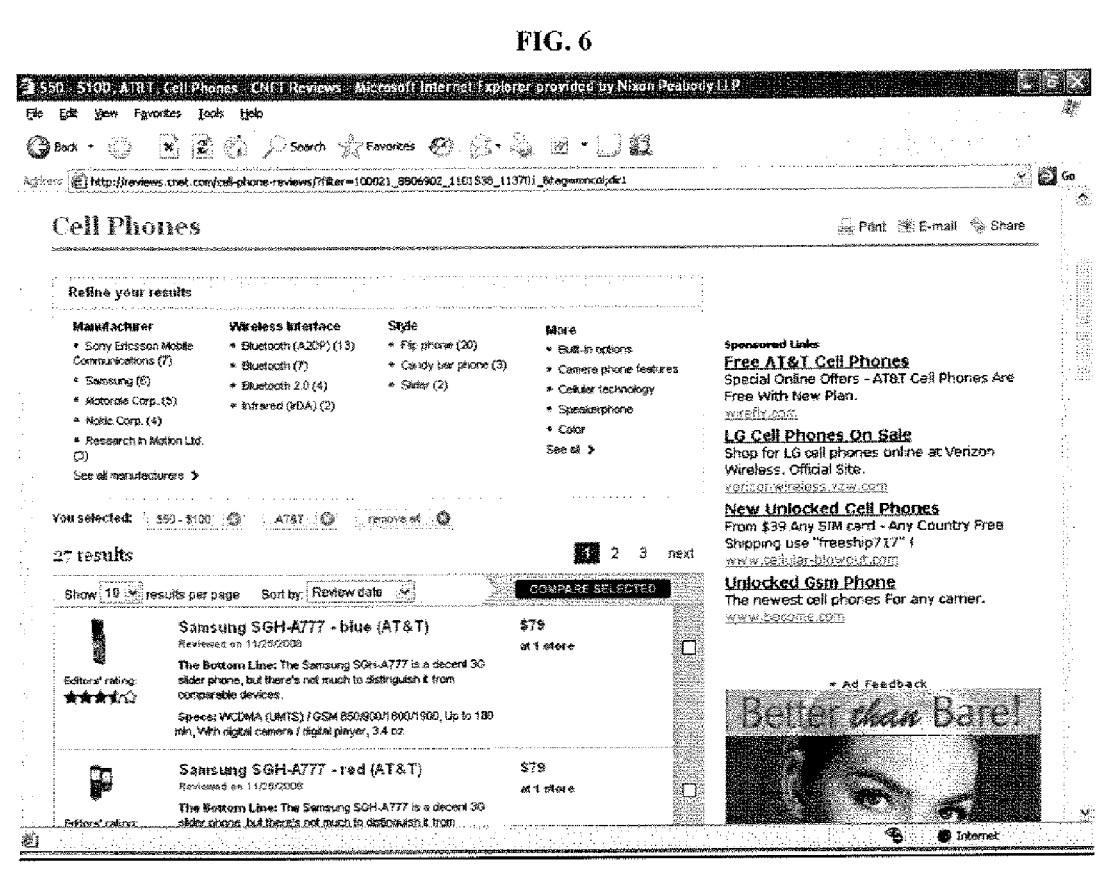

The information shown by the screenshots in FIG. 3-7 is now explained in more detail, as an example of how the user selects filter parameters. FIG. 3 shows a home page of a shopping website, CNET.COM™, which offers access to a catalog of technology products, each of which has multiple attributes associated with it, each of which has a corresponding value. As can be seen in FIG. 3, some of the categories of technology which are in the catalog include "Appliances", "Cell Phones", "GPS", "Laptops", and many others. When a user clicks on one of these hyperlinks, he or she is brought, for example, to a page as shown in FIG. 4, which would result if the user had chosen the "Cell Phones" category from the homepage in FIG. 3. The catalog then allows the user to navigate from among the many cell phones in the catalog by progressively choosing filter parameters which narrow the selection of cell phones under consideration. Continuing our example, the user might choose that his or her preference was to see cell phones whose service provider was AT&T™. This would restrict consideration by the catalog to the 241 cell phones whose associated service provider is AT&T™. This leads to the resulting display of FIG. 5, which shows the first two phones in an extended list of phones whose service provider is AT&T™. At this point, the set of criteria displays further narrowing filter parameters for selection by the user, such as price, manufacturer, wireless interface, and others. It is to be noted, of course, that this filtration is progressive, i.e. additive. That is, once it has been selected that the service provider is AT&T™, the catalog is designed to reflect, as in FIG. 6, after the appropriate filter parameter selection, only those $50-$100 phones that are also designed to have AT&T™ as a service provider. Proceeding onwards, the user may select the additional filter given these two constraints that the manufacturer of the phone is Sony Ericsson Mobile™ communications, as in FIG. 7. Thus, by adding these progressive filters, the search set narrows from hundreds of potential cell phones to 241 AT&T™ cell phones to 27 AT&T™/$50-$100 cell phones to 7 AT&T™/$50-$100/Sony Ericsson Mobile™ cell phones.

As a system accepts filter input while users search the catalog, it is possible to monitor the set of filter parameters that users of a catalog system enter over a period of time. This data can be used to draw inferences about the behavior of the overall group of users who have contributed to a set of filter parameters. Alternatively, this data may be used for other applications, such as by using text or graphics to summarize or depict the data, so that users may draw their own conclusions about what the data represents. Furthermore, the data from monitoring the set of filter parameters may allow the system to adopt a more intelligent approach to the filter interface with the users, in that it may allow the catalog interface to be able to be more or less selective about which filters or how many filters should become displayed to the user for their potential selection at any given time.

Figure 7:
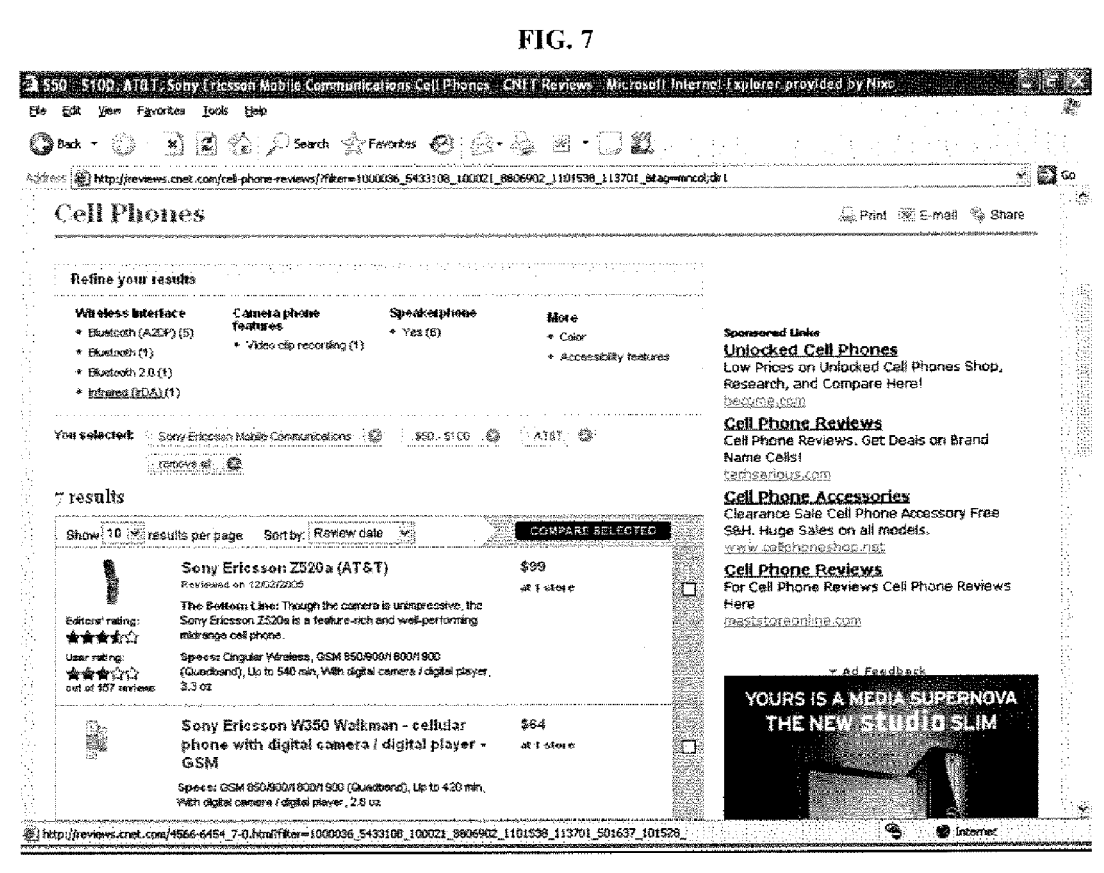
Figure 12:
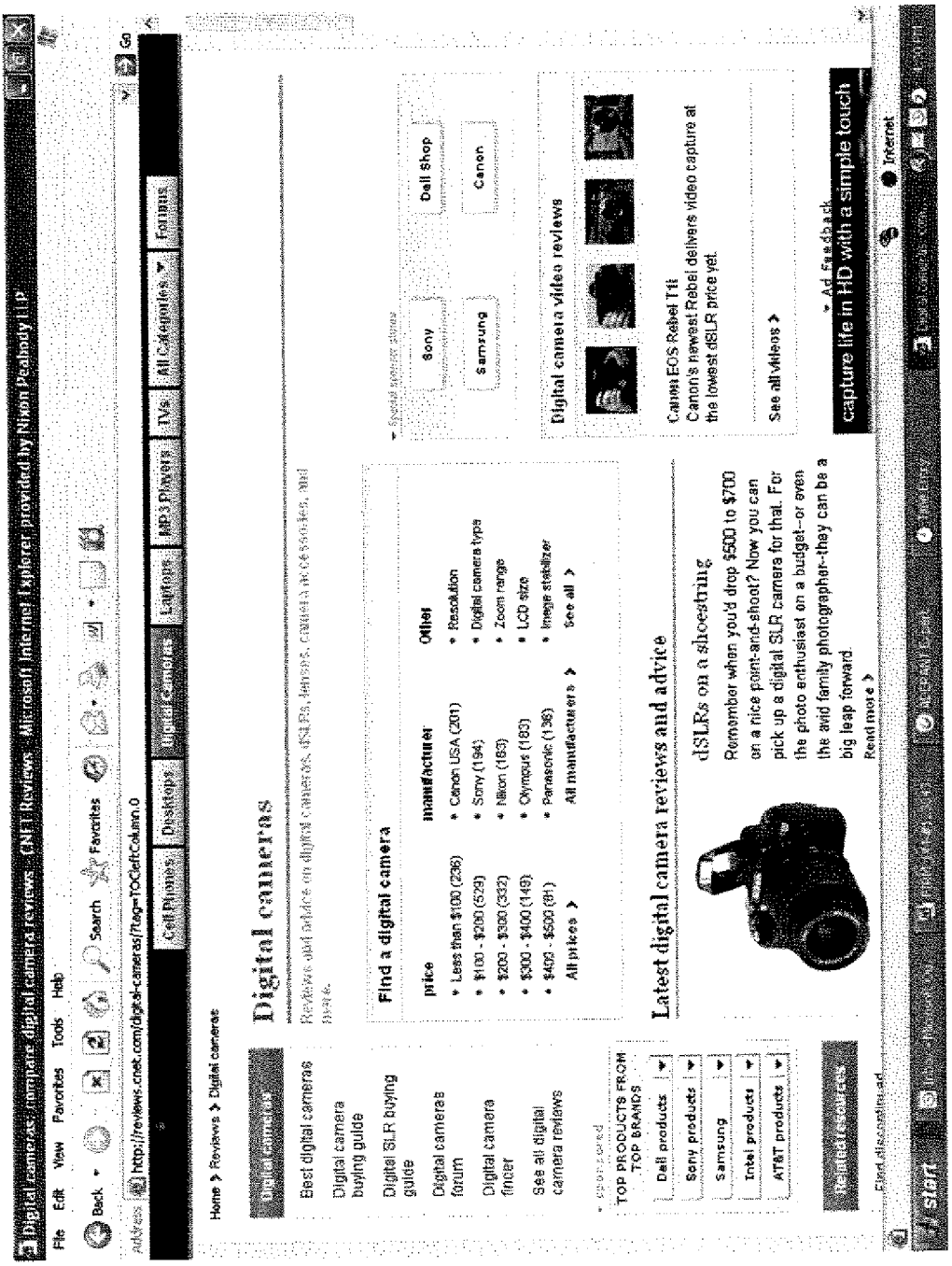
FIG. 12 is a screenshot of an catalog in accordance with an embodiment of the invention depicting options which may be selected for Digital Cameras.
Figure 13:
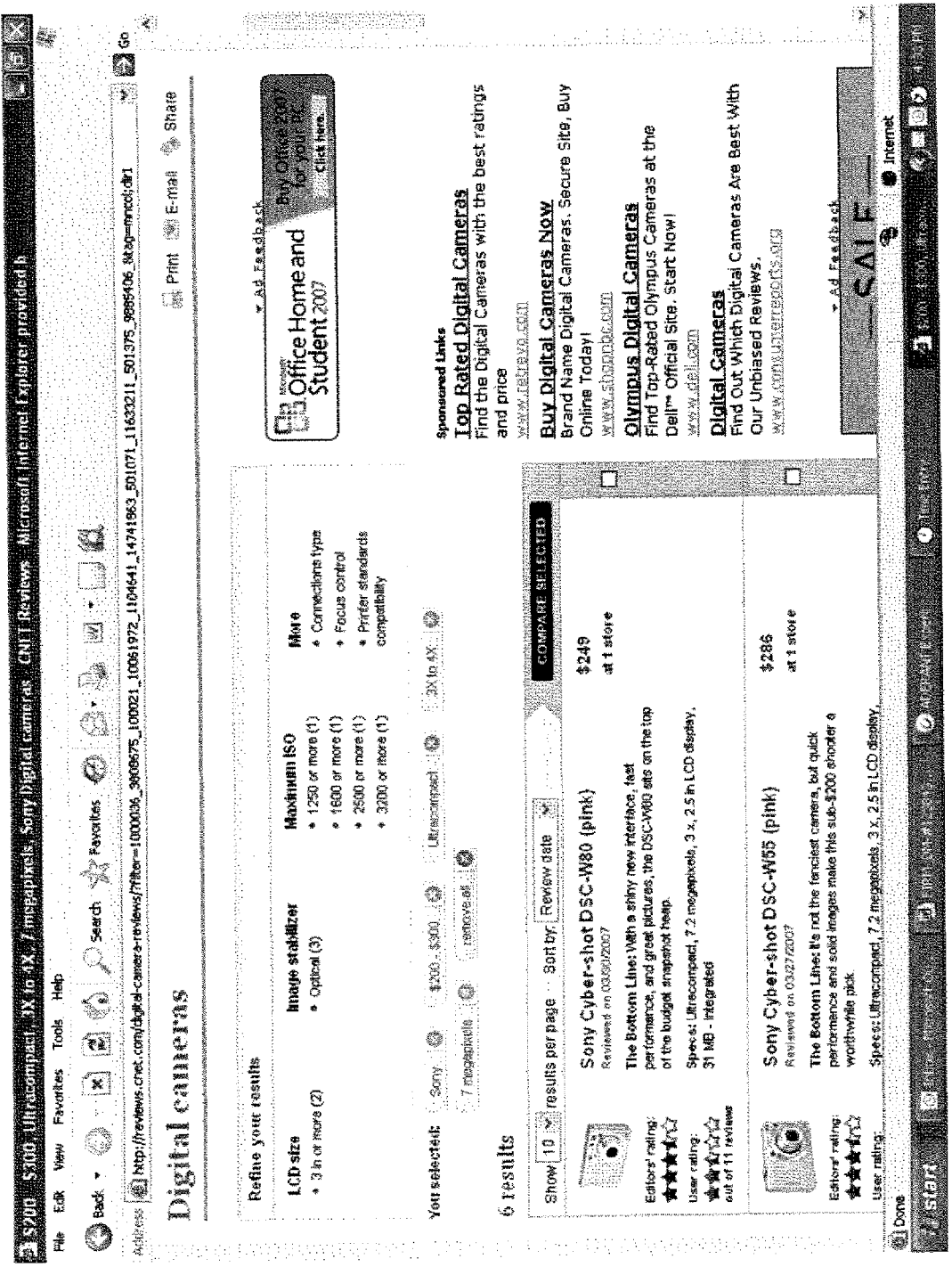
FIG. 13 is a screenshot of an catalog in accordance with an embodiment of the invention depicting a filter selected for Digital Cameras.
Figure 14:
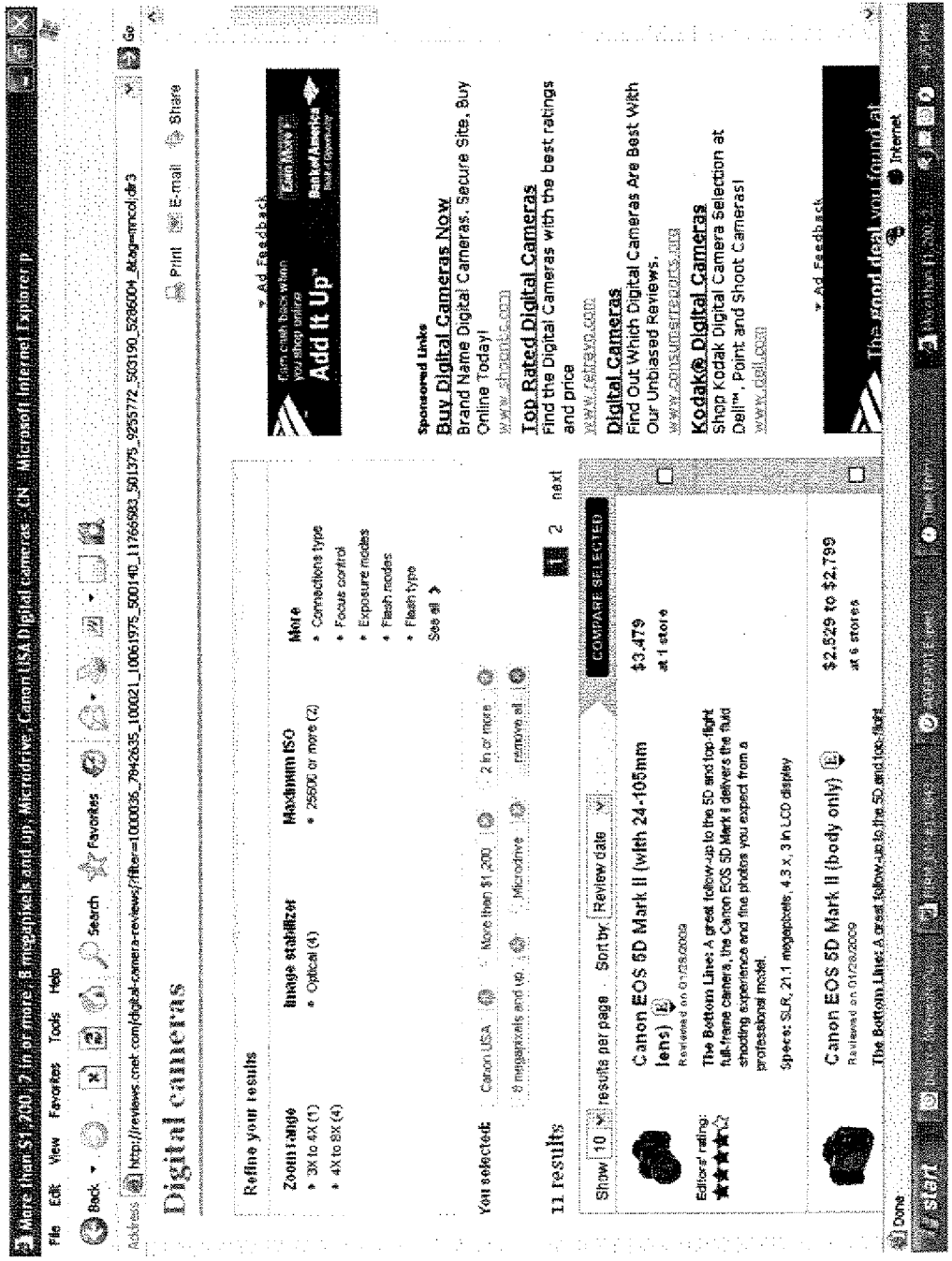
FIG. 14 is a screenshot of an catalog in accordance with an embodiment of the invention depicting a filter selected for Digital Cameras.

FIG. 15, along with FIGS. 7, 13, and 14, provides insight into how filters are transformed into a set of raw data that the filter refinement module 112 can work with. By tracking the user's clicks as he or she progressively selects the filter parameters from a catalog selection page such as FIG. 12, thereby narrowing the set of available products to produce a smaller set of products with characteristics that the user is looking for, a set of potentially useful data is generated. The user's actions may be captured, for example, if the catalog is accessed via a web page, where the web page consists of an HTML or XHTML document, by incorporating a facility which maintains a set of variables which change based on the user clicking on various filters. Technologies such as JavaScript scripts, Perl scripts, Java applets, JSP, ASP, as well as any other technology known in the art that allows the web page to register a click in a variable may be used by the various embodiments to maintain a record of filter parameter selections within the taxonomy for further analysis and/or manipulation. The monitoring module 108 thus obtains a record of complete filters, which are individual users groups of filter parameters in a given search.

Examples of complete filters are Cell Phones: Sony Ericsson Mobile Communications: $50-$100:AT&T (See FIG. 7), Digital Cameras: Sony™:$200-$300: Ultracompact: 3× to 4×: 7 Megapixels (See FIG. 13) and Digital Cameras. Canon USA™: More than $1,200:2 in or more: 8 Megapixels and Up: Microdrive (See FIG. 14). In FIG. 15, the transformations of these filter records, which involve selecting all of the filter records in a category, and then selecting only the information related to a specific attributes, are demonstrated. Each filter is a sequence of selected filter parameters, as indicated above. FIG. 15 illustrates how these three filters may be recorded as filter data 1501 1502 1503.

Figure 16:
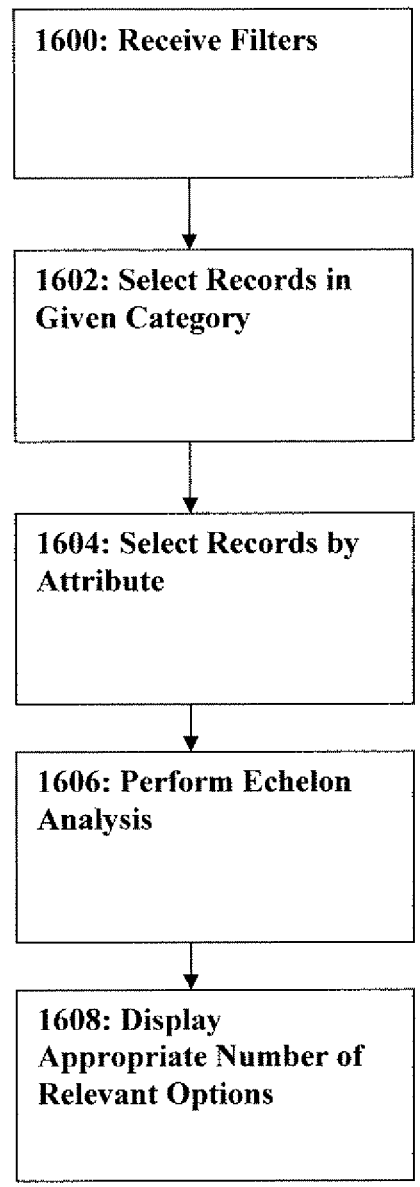
FIG. 16 is a flowchart illustrating how the filter data is transformed during the operation of the embodiments of the invention.

The filters follow a data transformation sequence as set forth in FIG. 16. In step 1600, the filter refinement module 112 receives the filters from the monitoring module 108, which has recorded them for further use. Then, in step 1602, the filter refinement module 112 selects the filters in a given category. In step 1604, the filter refinement module 112 proceeds to further narrow by attribute. In step 1606, which is elaborated upon below, echelon analysis occurs. Finally, in step 1608, the filter refinement module 112 communicates with the query module 104 to cause display of the appropriate number of relevant options, as determined in the previous steps.

Performing this sort of data transformation upon the filter records yields, after step 1604, results data 1506. In FIG. 9, a slightly longer example of this results data is portrayed as monitoring log data 901, which represents the data which results when filters are monitored over a period of time and all of the data for one category/combination is segregated out. FIG. 9 portrays an example record of filter parameter selections, along with how they are interpreted and processed inside of the monitoring module 108. A monitoring log data 901 may consist of a flat file of entries based on filters selected by users. That is, filter parameters might consist of a sequence of all of the processor speed filter parameter selections that were made by users 110 who were looking for information about desktops, or all of the price selections for users looking at cell phones. For example, in FIG. 9, a sample log 901 is presented for Digital Cameras/By Brand, containing a mixture of specific digital camera brand selections, presented as a sample. The monitoring log data 901 may be stored in any usable format, but an exemplary format would be to use a text file, and to have one entry per line, with the filter parameters in the filter parameter set separated by commas, as in the presentation in FIG. 9, which represents a subset of an actual set of monitoring log data, which would tend to be quite long in a heavily trafficked filter parameter choice management system 100.

FIG. 9 represents a report that summarizes the monitoring log data 901 and condenses it into a tally, the monitoring log summary 902. In the preferred embodiment, they are stored as noted above in monitoring log data 901 after being transformed so that each entry in one type of monitoring log data 901 reflects values of one attribute, and is reduced to a monitoring log summary 902 by counting how many instances of each value of the appropriate attribute has been selected. The filter refinement module 112 receives the monitoring log summary 902 from the monitoring module 108 to refine the choices available to the user. Three ways in which this refinement may work are illustrated in 902 and 903, 904 and 905, and 906 and 907 as leading to the displays of FIGS. 10 and 11.

Figure 10:
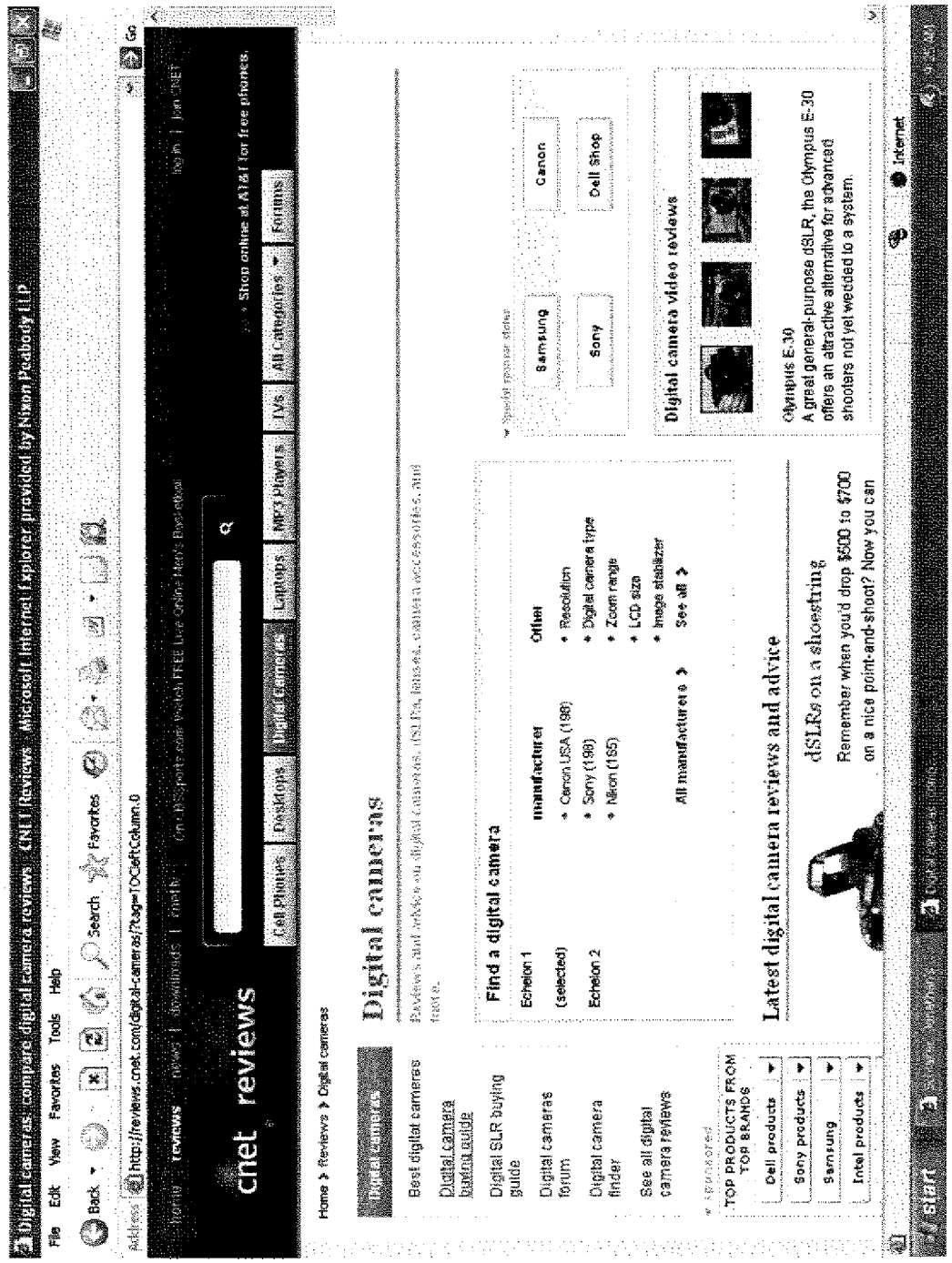
FIG. 10 is a mock display of an embodiment of the invention displaying Digital Camera Brand options when Echelon 1 is selected, in conjunction with the data from FIG. 9.
Figure 11:
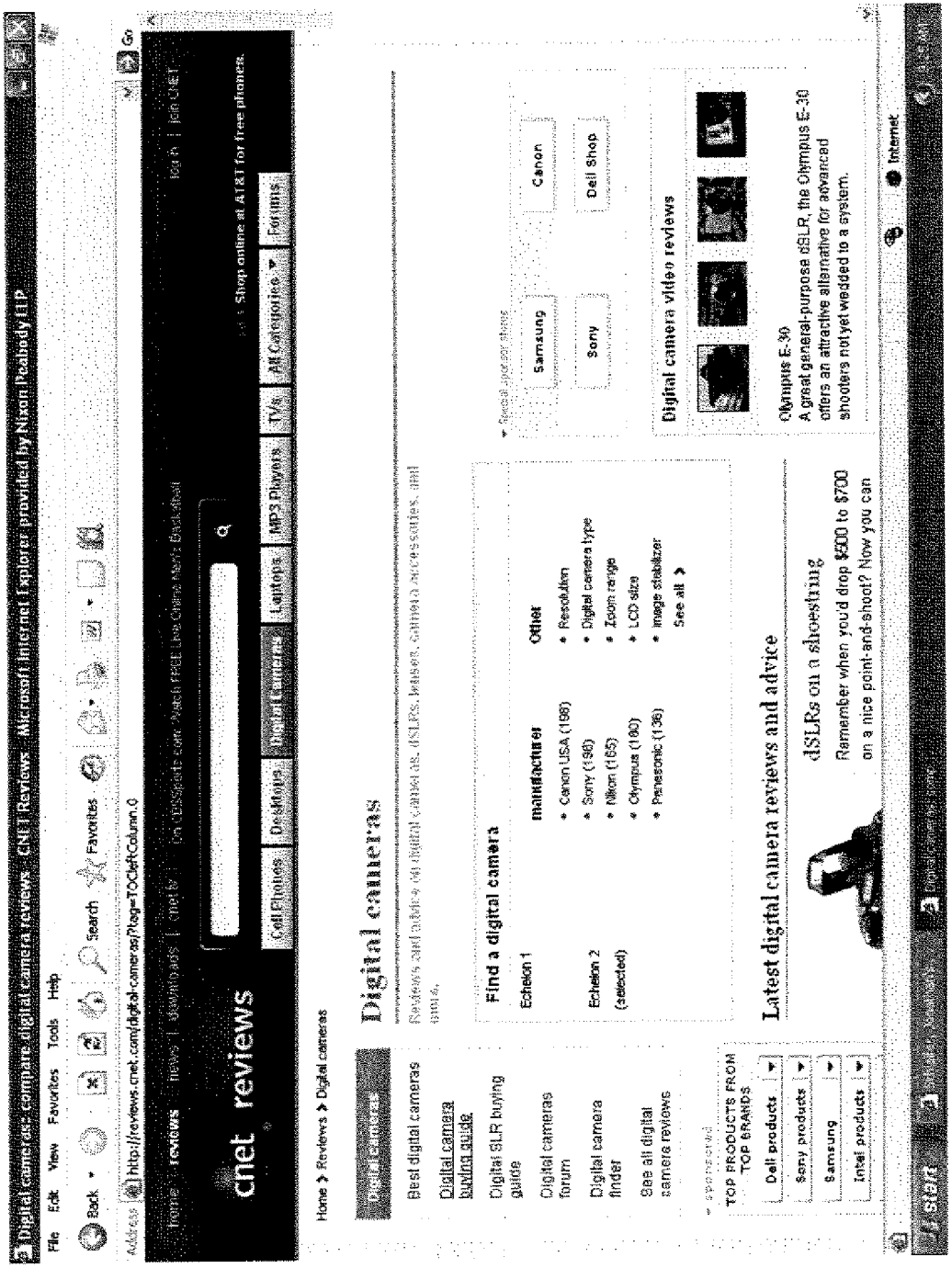
FIG. 11 is a mock display of an embodiment of the invention displaying Digital Camera Brand options when Echelon 2 is selected, in conjunction with the data from FIG. 9.

The operation of the embodiments may be effectively illustrated through the example presented in FIG. 9-11. One purpose of the embodiments is to offer the useful results of presenting only choices in the browsing and operation of a catalog such as described above that will be relevant to the user 110. The inventors have found that past filter selections a catalog tend to indicate what future users will tend to be interested in, because these past indications of interest show that future users 110 will probably be interested in these choices as well.

To capitalize on this principle, the system executes an overall method which is depicted in FIG. 8, which involves the steps of: Using a computer processor, operating a database module configured to store an electronic catalog of products, wherein the catalog comprises a taxonomy of products categories and products within the categories, the catalog further comprising attributes which describe products in a category and at least one value for said attributes 801, using a computer processor, operating a user interface module configured to display a subset of products in the catalog based on a filter parameter set consisting of categories and/or attributes 802, using a computer processor, operating a query module configured to display a set of filter parameters as options, receive a set of filter parameters as choices from the user, query the catalog, and present information in the catalog corresponding to the filter parameters to said user interface module for display to users 803, using a computer processor, operating a monitoring module configured to monitor the filter parameters received by the query module to generate user activity data consisting of filter parameter selections 804, and using a computer processor, operating a filter refinement module configured to analyze the user activity data received by the monitoring module and regulate which at least one of filter parameters appear as options for the user in the query module and how many filter parameters appear as options for the user 805.

In FIG. 9, an example of how this method embodiment might operate on a system embodiment is provided. It is to be noted that the invention may also be carried out with embodiments such as an apparatus which provides means for carrying out the steps provided for by the method embodiment or by using computer readable medium with executable instructions stored thereon, the instructions performing the method of the invention when executed by a suitable computing apparatus.

FIG. 9 presents a log of the results of the monitoring module 108 which has been transformed by the filter refinement module 112. Monitoring log data 901 is counted to become a monitoring log summary 902. Users 110 can then select "echelons" which are predefined and represent levels which the users 110 can select between which control which options are displayed for selection. The echelon configuration may also be intelligently selected by the embodiments based on information about the user which the embodiments have available to them, such as information which the user have provided by responding to surveys, by personal information about the user such as age, gender, profession, interests, or other information, or by feedback which other users have provided about which echelon settings are most effective and helpful. For example, consider the case where there have been 100 filter parameter selections in the monitoring log data 901 for brands of digital camera selected by previous users, of which 47 were Canon USA™ (47%), 25 were Sony™ (25%), 15 were Nikon™ (15%), 5 were Olympus™ (5%), 5 were Panasonic™ (5%), and 3 were Other Brands (3%).

This data can then be used to set up echelons in at least 3 ways, though many more are of course possible and the scope of the embodiments should not be limited to the samples presented here. It is also to be noted that any number of echelons is possible; in the case of one echelon, there is only one echelon and the system always applies one set of conditions to control values of an attribute or category in question. However, there may be as many echelons as there are values of the attribute or category in question. Echelons essentially represents ways of interpreting the monitoring log summary 902 to affect which and how many filter parameter options the query module 104 presents to the user.

Echelons 1A 902 and 2A 903 illustrate how only Canon USA™, Sony™, and Nikon™ are displayed given the criterion, "Show Brands Covering 80% of Filter Parameter Selections", but Olympus™ and Panasonic™ are added under the criterion, "Show Brands Covering 95% of Filter Parameter Selections". Under the criterion "Show Brands Covering X % of Filter Parameter Selections", the most frequently selected brand is included first, then the second most frequently selected brand, until X % is reached.

Echelons 1B 904 and 2B 905 illustrate how only Canon USA™, Sony™, and Nikon™ are displayed given the criterion, "Only Show Brands with 10% or more of Filter Parameter Selections", but Olympus™ and Panasonic™ are added under the criterion, "Only Show Brands with 5% or more of Filter Parameter Selections". Under the criterion "Only Show Brands with X % or more of Filter Parameter Selections", all brands that meet the minimum threshold are included, however many that involves.

Also, Echelons 1C 906 and 2C 907 illustrate how only Canon USA™, Sony™, and Nikon™ are displayed given the criterion, "Show 3 Brands with the Most Clicks", but Olympus™ and Panasonic™ are added under the criterion, "Show 5 Brands with the Most Clicks". The operation of these echelon criteria is self-explanatory.

Thus, applying these echelon criteria at the levels indicated in Echelons 1A-C 902 904 906 and 2A-C 903 905 907 yields the corresponding sample results in FIG. 10-11. Naturally, given a different monitoring log summary, these options would change appropriately.

Thus, generally most criteria for which Brands (or whatever other attribute or category values are under consideration) will follow one of these three forms: Selecting whatever attribute or category values (however many they may be) that satisfy the criterion that a given percentage or proportion of filter parameter selections have been represented, satisfying the criterion that a value must meet a threshold percent or proportion of the set of selections before it is included, or arbitrarily an echelon will attempt to include a set number of values that are most popular.

It is noted that all of these approaches can be inverted, such that least popular values will be included, all values which are less than a threshold will be included, and all values which would have remained after a proportion was included instead become the set which is displayed. If there is a question about which values to include, such as a tie, the value to include may be selected randomly, both values may be included, or neither value may be included. Which approach to use may be preset in an embodiment, or user-set. The user interface module 106 may operate on a command-line or a GUI (Graphical User Interface), but ideally a GUI will reflect the preferred embodiment and a web browser or other graphical Internet access tool may reflect a preferred embodiment of the invention.

It is to be noted that each attribute or category may ideally have its own system of echelons, or all attributes and categories may share a system of echelon settings. For example, all attributes could have a three-tiered setting of echelons for only show values of an attributes with 20% or more of filter parameter selections, only show values of an attributes with 10% or more of filter parameter selections, and only show values of an attributes with 5% or more of filter parameter selections, or categories and brands could have that system, and price might have a setup with show 2 price levels, show 3 price levels, show 5 price levels, and show 6 price levels.

In an embodiment of the invention, the user interface module may be configured to give an option to display the hidden choices, or leave them concealed. There may also be constraints placed on the timing of filter parameter entry, such that only new filter parameters are considered or only old filter parameters are considered (with new and old being predefined or user-selectable or user-definable concepts, such as by allowing the user to select a range of time to consider in making the determinations about which choices to offer).

It is also a characteristic of some embodiments of the invention that they may possess an option that they may allow the user to override the automatic regulation of which attributes or categories are displayed by the filter refinement module 112. This may take the form of either a facility which allows the user to change the criteria which define the echelons, or it may take the form of allowing the user 110 to manually specify which options will be visible to him or her when browsing the catalog. There may also be a "reset" button which may cause the user interface module 106 to display all or a preselected set of values of one or more attributes or categories if it has been restricted too much by the operation of an echelon's criteria.

Thus, the embodiments allow collection of information about the users' filter selection which can adaptively reflect trends in filter selection, and glean from those trends valuable information which can improve the experience of catalog users by helping to avoid wasted time and prevent confusion. Thus, these embodiments represent a powerful and sophisticated e-commerce tool which can significantly streamline and regulate the interface of a catalog of a type described herein with minimal additional computation.

It should be noted that the content targeting system 100 is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. A computer-implemented method, performed by one or more computing devices, for providing a user interface for navigation of an electronic catalog of assets organized by attributes where the assets are associated with one or more values of the attributes, the method comprising:
    transmitting, by at least one of the one or more computing devices, a user interface including a first filter parameter set configured to allow a user to select one or more filter parameters corresponding to attribute values of assets;
    receiving, by at least one of the one or more computing devices, selection of one or more filter parameters in the first filter parameter set;
    recording, by at least one of the one or more computing devices, the selection of one or more filter parameters in the first filter parameter set;
    inferring, by at least one of the one or more computing devices, one or more additional filter parameters likely to be selected based on past progressive filter selection;
    generating, by at least one of the one or more computing devices, a second filter parameter set including the one or more additional filter parameters likely to be selected; and
    transmitting, by at least one of the one or more computing devices, a second user interface including the second filter parameter set and a display area displaying a subset of assets in the catalog corresponding to the selected parameters in the first filter parameter set.

2. The method of claim 1, wherein the past progressive filter selection comprises a data set indicating for each of a plurality of users an ordered progressive listing of one or more filter parameter selections including at least a selection of one of the filter parameters in the first filter parameter set and a subsequent selection of one of the filter parameters in the second filter parameter set.

3. The method of claim 2, wherein the data set excludes filter parameter selections before a determined date.

4. The method of claim 2, wherein the second filter parameter set has a variable cardinality and wherein the step of inferring one or more additional filter parameters includes:
    determining a number of filter parameters to be included in the second filter parameter set having at least a threshold likelihood of being subsequently selected based on the data set, wherein the step of determining one or more filter parameters includes determining additional filter parameters having at least the threshold likelihood of subsequently selected.

5. The method of claim 2, wherein the one or more additional filter parameters are compatible with the selected one or more filter parameters.

6. The method of claim 2, wherein the second filter parameter set has a set cardinality and the one or more additional filter parameters likely to be selected are additional filter parameters most likely to be selected sufficient to fill the second filter parameter set.

7. The method of claim 1, wherein the second user interface includes a display hidden filter parameters control, and wherein the method further comprises:
    transmitting a third user interface in response to selection of the display hidden filter parameters control, the third user interface including a third filter parameter set including all filter parameters compatible with the selected one or more filter parameters.

8. The method of claim 1, wherein the assets are digital media.

9. The method of claim 1, wherein the assets are products.

10. A system for providing a user interface for navigation of an electronic catalog of assets organized by attributes where the assets are associated with one or more values of the attributes comprising:
    a memory; and
    a processor operatively coupled to the memory, the processor configured to perform the steps of:
        transmitting, by at least one of the one or more computing devices, a user interface including a first filter parameter set configured to allow a user to select one or more filter parameters corresponding to attribute values of assets;
        receiving, by at least one of the one or more computing devices, selection of one or more filter parameters in the first filter parameter set;
        recording, by at least one of the one or more computing devices, the selection of one or more filter parameters in the first filter parameter set;
        inferring, by at least one of the one or more computing devices, one or more additional filter parameters likely to be selected based on past progressive filter selection;
        generating, by at least one of the one or more computing devices, a second filter parameter set including the one or more additional filter parameters likely to be selected; and
        transmitting, by at least one of the one or more computing devices, a second user interface including the second filter parameter set and a display area displaying a subset of assets in the catalog corresponding to the selected parameters in the first filter parameter set.

11. The system of claim 10, wherein the past progressive filter selection comprises a data set indicating for each of a plurality of users an ordered progressive listing of one or more filter parameter selections including at least a selection of one of the filter parameters in the first filter parameter set and a subsequent selection of one of the filter parameters in the second filter parameter set.

12. The system of claim 11, wherein the data set excludes filter parameter selections before a determined date.

13. The system of claim 11, wherein the second filter parameter set has a variable cardinality and wherein the step of inferring one or more additional filter parameters includes:
    determining a number of filter parameters to be included in the second filter parameter set having at least a threshold likelihood of being subsequently selected based on the data set, wherein the step of determining one or more filter parameters includes determining additional filter parameters having at least the threshold likelihood of subsequently selected.

14. The system of claim 11, wherein the one or more additional filter parameters are compatible with the selected one or more filter parameters.

15. The system of claim 11, wherein the second filter parameter set has a set cardinality and the one or more additional filter parameters likely to be selected are additional filter parameters most likely to be selected sufficient to fill the second filter parameter set.

16. The system of claim 10, wherein the second user interface includes a display hidden filter parameters control, and wherein the processor is further configured to perform the step of:
    transmitting a third user interface in response to selection of the display hidden filter parameters control, the third user interface including a third filter parameter set including all filter parameters compatible with the selected one or more filter parameters.

17. The system of claim 10, wherein the assets are digital media.

18. The system of claim 10, wherein the assets are products.

19. Computer-readable code stored on a non-transitory computer-readable medium that, when executed by a computing device, performs a method for providing a user interface for navigation of an electronic catalog of assets organized by attributes where the assets are associated with one or more values of the attributes, the method comprising:

transmitting a user interface including a first filter parameter set configured to allow a user to select one or more filter parameters corresponding to attribute values of assets;

receiving selection of one or more filter parameters in the first filter parameter set;

recording the selection of one or more filter parameters in the first filter parameter set;

inferring one or more additional filter parameters likely to be selected based on past progressive filter selection;

generating a second filter parameter set including the one or more additional filter parameters likely to be selected; and transmitting a second user interface including the second filter parameter set and a display area displaying a subset of assets in the catalog corresponding to the selected parameters in the first filter parameter set.

20. The computer-readable medium of claim 19, wherein the past progressive filter selection comprises a data set indicating for each of a plurality of users an ordered progressive listing of one or more filter parameter selections including at least a selection of one of the filter parameters in the first filter parameter set and a subsequent selection of one of the filter parameters in the second filter parameter set.

21. The computer-readable medium of claim 20, wherein the data set excludes filter parameter selections before a determined date.

22. The computer-readable medium of claim 20, wherein the second filter parameter set has a variable cardinality and wherein the step of inferring one or more additional filter parameters includes:

determining a number of filter parameters to be included in the second filter parameter set having at least a threshold likelihood of being subsequently selected based on the data set, wherein the step of determining one or more filter parameters includes determining additional filter parameters having at least the threshold likelihood of subsequently selected.

23. The computer-readable medium of claim 20, wherein the one or more additional filter parameters are compatible with the selected one or more filter parameters.

24. The computer-readable medium of claim 20, wherein the second filter parameter set has a set cardinality and the one or more additional filter parameters likely to be selected are additional filter parameters most likely to be selected sufficient to fill the second filter parameter set.

25. The computer-readable medium of claim 19, wherein the second user interface includes a display hidden filter parameters control, and wherein the method further comprises:

transmitting a third user interface in response to selection of the display hidden filter parameters control, the third user interface including a third filter parameter set including all filter parameters compatible with the selected one or more filter parameters.

26. The computer-readable medium of claim 19, wherein the assets are digital media.

27. The computer-readable medium of claim 19, wherein the assets are products.

* * * * *